(12) United States Patent
AbuGhazaleh et al.

(10) Patent No.: US 10,041,640 B2
(45) Date of Patent: Aug. 7, 2018

(54) CABLE MANAGEMENT SYSTEMS WITH INTEGRATED LOW VOLTAGE LIGHTING

(71) Applicant: Hubbell Incorporated, Shelton, CT (US)

(72) Inventors: Shadi Alex AbuGhazaleh, Guilford, CT (US); Michael Robert O'Connor, Seymour, CT (US); Nathaniel Lewis Herring, Harwinton, CT (US); Jason Zachary Walker, Bethany, CT (US)

(73) Assignee: Hubbell Incorporated, Shelton, CT (US)

(*) Notice: Subject to any disclaimer, the term of this patent is extended or adjusted under 35 U.S.C. 154(b) by 60 days.

(21) Appl. No.: 15/145,470

(22) Filed: May 3, 2016

(65) Prior Publication Data

US 2017/0321854 A1 Nov. 9, 2017

(51) Int. Cl.
| | |
|---|---|
| *F21V 33/00* | (2006.01) |
| *F21S 8/04* | (2006.01) |
| *F21V 23/00* | (2015.01) |
| *F21V 23/06* | (2006.01) |
| *F21V 15/01* | (2006.01) |
| *F21S 4/20* | (2016.01) |
| *H02G 3/04* | (2006.01) |
| *F21Y 101/02* | (2006.01) |
| *F21Y 103/00* | (2016.01) |

(52) U.S. Cl.
CPC ............... *F21S 8/043* (2013.01); *F21S 4/20* (2016.01); *F21S 8/046* (2013.01); *F21V 15/01* (2013.01); *F21V 23/001* (2013.01); *F21V 23/06* (2013.01); *F21V 33/006* (2013.01); *H02G 3/0437* (2013.01); *F21Y 2101/02* (2013.01); *F21Y 2103/003* (2013.01)

(58) Field of Classification Search
USPC ................... 362/234, 249.02, 249.11, 404
See application file for complete search history.

(56) References Cited

U.S. PATENT DOCUMENTS

| | | | | |
|---|---|---|---|---|
| 2,445,198 A * | 7/1948 | Wiesmann | ........... | H02G 3/0437 174/68.3 |
| 3,042,351 A * | 7/1962 | Du Bois | .............. | H02G 3/0437 248/49 |
| 3,108,750 A * | 10/1963 | Kerns | ....................... | F21S 2/00 174/117 FF |
| 4,945,982 A * | 8/1990 | Das | ........................... | F24F 1/06 165/125 |
| 5,109,643 A * | 5/1992 | Speers | ...................... | E04B 7/00 52/220.3 |
| 2002/0003702 A1* | 1/2002 | Ladstatter | ............. | F21V 21/025 362/249.01 |
| 2016/0047539 A1* | 2/2016 | Cano | ................... | F21V 33/0012 362/133 |
| 2016/0061429 A1* | 3/2016 | Waalkes | ............... | H01R 25/142 362/217.15 |

* cited by examiner

Primary Examiner — Vip Patel
(74) *Attorney, Agent, or Firm* — Wissing Miller LLP

(57) ABSTRACT

Cable management systems that include a light source, such as a low voltage light source, integrally formed into or mounted to a cable management frame.

26 Claims, 6 Drawing Sheets

CABLE MANAGEMENT SYSTEMS WITH INTEGRATED LOW VOLTAGE LIGHTING

BACKGROUND

Field

The present disclosure relates to cable management systems and, more particularly, to cable management system frames with low voltage lighting incorporated into the frame of the cable management system.

Description of the Related Art

Data centers, computer rooms and telecommunication rooms generally include arrays of racks or cabinets arranged in one or more rows with aisles between the rows. Each rack or cabinet houses telecommunication cabling infrastructure and electronic equipment including patch panels, servers, switches, routers, etc. The cabling infrastructure includes cabling that extends between the electronic equipment within the racks or cabinets, cabling that extends between racks in the data center, computer room or telecommunication room, and cabling that extends into and out of the data center, computer room or telecommunication room. Often, cable management systems in data centers, computer rooms and telecommunication rooms are mounted overhead and provide cable pathways for routing the cabling. The ideal placement of the overhead cable management systems is often in the aisles between the racks or cabinets. However, existing overhead ceiling lighting in data centers, computer rooms and telecommunication rooms is also generally provided in the aisles between the racks or cabinets. In such instances, the overhead cable management system interferes with the light emitted from the overhead ceiling lighting.

SUMMARY

The present disclosure provides configurations of cable management systems that have integrated therein low voltage lighting. In one exemplary configuration the cable management system includes a cable management frame, and a lighting system incorporated into the cable management frame. The lighting system may be incorporated into the cable management frame by integrally forming the lighting system into the cable management frame. Electrical wiring for the lighting system may also be incorporated into the frame.

The present disclosure also provides configurations of lighting kits for cable management systems. In one exemplary configuration, the lighting kit includes a structural member, and at least one low voltage lighting assembly mounted to the structural member. The structural member and the at least one low voltage lighting assembly can be incorporated into the cable management system by, for example, integrally forming the at least one low voltage lighting assembly into the cable management system.

The present disclosure also provides configurations of modular units for cable management systems. In one exemplary configuration, the modular unit includes a frame having a predefined length and width, at least one low voltage lighting assembly incorporated into the frame, and at least one electrical wire incorporated into the frame. The predefined length of the frame terminates at a first end and a second end, and the at least one electrical wire terminates at the first end with a connector and at the second end with a connector.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

The present disclosure provides embodiments of cable management systems having a low voltage lighting system incorporated into a cable management system frame. For ease of description, the cable management system frame may also be referred to herein as the "frame." The low voltage lighting system may be incorporated directly into the frame, or added to the frame. Cable management systems according to the present disclosure include a frame and a low voltage lighting system incorporated into the frame. The frame according to the present disclosure includes any frames, structures or infrastructure that can be used to support and route cabling within, for example, data centers, computer rooms and/or telecommunication rooms. The frame also includes any frames, structures or infrastructure that can be used to support and route cabling within, racks, cabinets, raceways or other structures. According to various embodiments of the present disclosure, the lighting system may include one or more low voltage lighting assemblies or one or more lighting modules. Each lighting assembly or module may include one light emitting diode (LED) assembly or an array of light emitting diodes (LEDs).

Illustrative embodiments of the present disclosure provide low voltage lighting systems that are incorporated into the frame. Incorporated into the frame generally includes building the low voltage lighting system into the frame or making the low voltage lighting system part of the frame. For example, incorporating the low voltage lighting system into the frame includes integrating the low voltage lighting system into the frame. As another example, incorporating the low voltage lighting system into the frame includes mounting the low voltage lighting system to the frame. As another example, incorporating the low voltage lighting system into the frame includes adding the low voltage lighting system to the frame.

In certain illustrative embodiments described herein, the frame forming the cable management system is a modular frame where individual modules are interconnected using, for example, butt splices. The butt splices may include butt connectors for connecting module ends, and may be constructed from metal (e.g., stamped steel, spring steel), plastic (e.g., polycarbonate or nylon) or a combination of such materials. Alternatively, steel, brass, aluminum or other appropriate alloy may be used for the appropriate components. Of course, other types of materials such as other types of plastics, composites, etc. may be used as desired and where appropriate.

Figure 1:
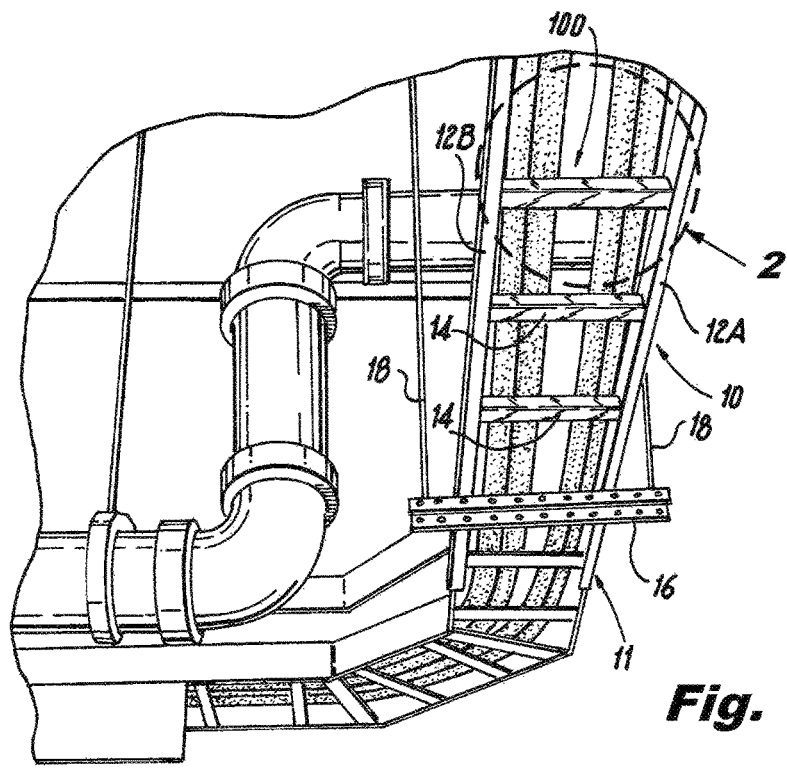
FIG. 1 is a view showing an exemplary embodiment of a cable management system with a frame having a low voltage lighting system incorporated into the frame.
Figure 3:
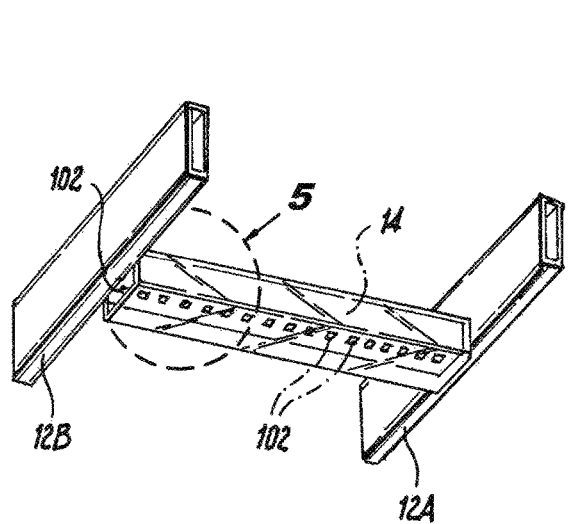
FIG. 3 is a magnified view of another exemplary embodiment of a low voltage lighting assembly incorporated into the cable management system frame of FIG. 1 by mounting the low voltage lighting assembly to the frame.
Figure 4:
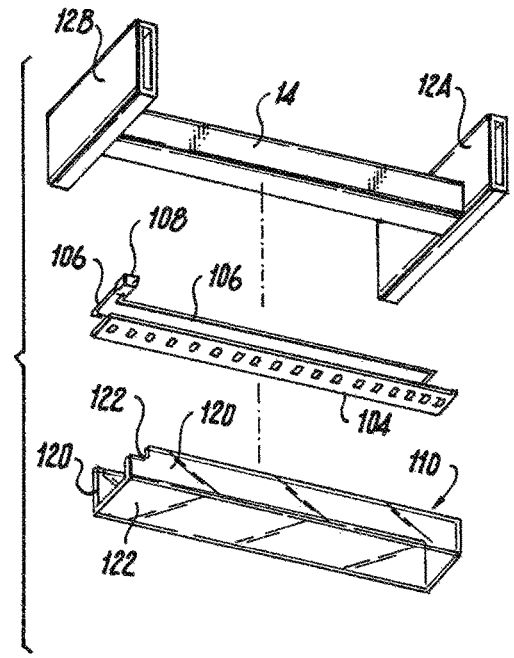
FIG. 4 is an exploded view of the low voltage lighting assembly of FIG. 3.

Referring now to FIG. 1, an exemplary embodiment of a cable management system according to the present disclosure is shown. The cable management system 10 may be any type of cable management system including, for example, room type cable management systems where overhead frames are attached to a ceiling and low voltage lighting is incorporated into the frame. Room type cable management systems also include frames installed under flooring. Examples of overhead frames include ladder tray systems, round wire basket tray systems, flat wire basket tray systems, etc. or any combination thereof. An example of a frame installed under flooring is a cable tray type frame. Other types of cable management systems include frames such as raceways, braces, support such as horizontal or vertical supports, forming the infrastructure of cabinets and/or enclosures, etc., and a low voltage lighting system incorporated into the frame.

Generally, overhead cable management systems are formed from a plurality of modular units attached together to form a continuous frame. The modular units may include straight modular units, curved modular units and/or dropout modular units where the vertical height of the frame changes from one end of the dropout modular unit to another end of the dropout modular unit. Examples of curved modular units include 90 degree curved modular units, 45 degree curved modular units, S-shaped curved modular units and C-shaped curved modular units. The modular units may be provided in a variety of widths, including for example, 6", 12", 18" and 24" widths. The straight modular units may be provided in a variety of lengths, including for example, 6', 10' and 15' lengths. The modular units are connected together using, for example, butt splices described in more detail below. However, other know splices may also be used to connect the modular units together.

The cable management system 10 shown in FIG. 1 has an overhead ladder type tray frame 11 having parallel side members 12A, 12B and rungs or cross members 14. The cross members 14 may be secured to side members 12A, 12B by mechanical connection, such as screws, rivets, weld, etc. As noted, such frames 11 are generally provided as modular frames that can be user configured and attached together to form a continuous ladder tray frame. The ladder trays may include straight ladder tray modules and/or curved ladder tray modules. Each ladder tray module includes a pair of side members 12A, 12B and a plurality of ladder cross members or rungs 114. The ladder type tray frame 11 may be held in place relative to a ceiling by supports 16 mounted to the ceiling using drop members 18, such as threaded rods.

Figure 2:
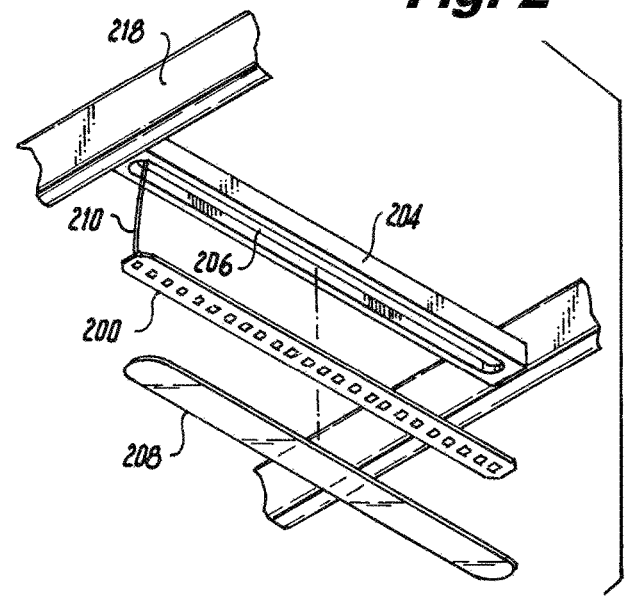
FIG. 2 is an exploded view of an exemplary embodiment of a low voltage lighting assembly incorporated into the cable management system frame of FIG. 1 by integrally forming the low voltage lighting system into the frame.

Referring to FIGS. 1 and 2, an illustrative embodiment of a low voltage lighting assembly forming part of the lighting system of the cable management system is shown. In this embodiment, the low voltage lighting assembly includes an LED strip 200 formed to be incorporated into the frame 11, and the low voltage lighting system includes one or more LED strips 200.

Each LED strip 200 is formed to be integral with the rungs or cross members 204 of the frame. Cross members 204 include a recess 206 dimensioned to receive the LED array 200. The LED array 200 may also be covered with a protective cover 208 made of, for example, glass, Plexiglas or other suitable type of material. Power for the LED array 200 may be provided by low voltage power and ground wires 210 that run through the frame, such as through side members 218 and/or rungs 204, and permanently connected to LED array. Alternatively, the LED array wiring 210 may have a connector so that it can be removably connected to low voltage wiring extending through, for example, side member 218. In instances where the frame is made of an electrically conductive material, such as aluminum, a single low voltage power wire can be run through the frame, such as through side members 218 and/or rungs 204, and permanently connected to the LED array 200. In such instances, the ground for the LED array 200 power circuit can be derived from the electrically conductive frame.

Referring now to FIGS. 1 and 3-5, another illustrative embodiment of the low voltage lighting assembly is shown. In this illustrative embodiment, the low voltage lighting assembly includes one or more LEDs 102 mounted to a cross member 14 of the cable management system 10. The low voltage lighting system in this configuration includes one or more LEDs 102. When using more than one LED in the low voltage lighting assembly, the LEDs 102 may be part of an LED strip 104, where the LEDs 102 are arranged in an array such as, for example, a linear array. The LED strip 104 may be held in place on a cross member 14 in various ways. For example, the LED strip 104 may be held in place utilizing mechanical fasteners such as screws, clips, rivets, double sided tape, etc. According to the embodiment shown in FIGS. 1 and 3-5, the LED strip 104 is held in place utilizing a cover 110. Cover 110 may be clear Plexiglas covering the led strip 104 and dimensioned to snap fit snugly to cross member 14. For example, sides 120 of cover 110 may be flexible such that they can be slid over cross member 14 to hold cover 110 in place. LED strip 104 and cover 110 may also be formed as modular units so that lighting can be easily added to cross members 14 of the frame, as desired.

Figure 5:
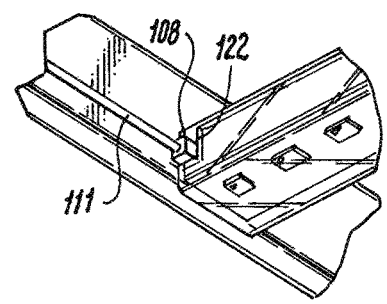
FIG. 5 is a magnified view of a portion of the cable management system frame and the low voltage lighting assembly of FIG. 3.

The LED strip 104 also includes electrical leads 106 and connector 108. At least one of the sides 120 of cover 110 may include a notch 122 through which the electrical leads 106 and/the or connector 108 extends, as seen in FIG. 5. Low voltage wiring 111, seen in FIG. 5, may extend from a remote low voltage power supply (not shown) along and integrally incorporated into the frame, such as along the side members 12A and/or 12B of the ladder tray type frame, and may include spaced connectors for connection to connectors 108 so that multiple low voltage lighting assemblies, e.g., LED strips, may be provided along the cable management system In instances where the low voltage lighting assembly is in the form of a retrofit kit to be added to an existing cable management system frame, the connector 108 can be connected to low voltage wiring that would be run along the frame, such as along the top of the ladder tray type frame.

Figure 6:
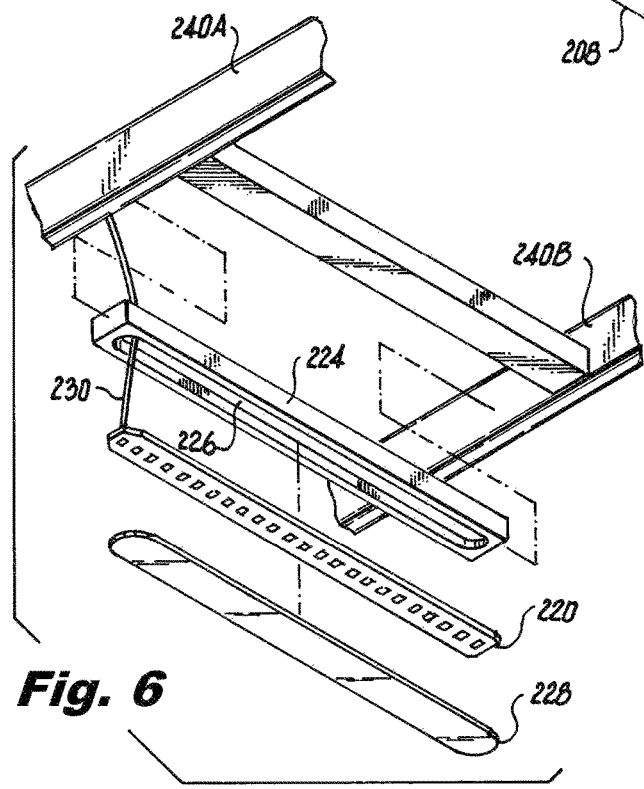
FIG. 6 is an exploded view of another exemplary embodiment of a low voltage lighting assembly incorporated into the cable management system frame of FIG. 1.

Referring now to FIG. 6, another illustrative embodiment of a low voltage lighting assembly used as a retrofit kit is shown. In this illustrative embodiment, the low voltage lighting assembly includes an LED strip 220 that is formed to be integral with a retrofit cross member 224. The low voltage lighting system in this configuration would include one or more LED strips 220.

Each LED strip 220 can be snap fit between side members 240A, 240B of the ladder type tray system. Retrofit cross members 224 include a recess 226 dimensioned to receive LED strip 220. According to an embodiment of the present disclosure, the LED strip 220 can be covered and protected with a protective cover 228 that may be made of glass, Plexiglas or other suitable type of material. According to this embodiment of the present disclosure, power for the low voltage lighting assembly can be provided by electrical wiring that runs along the frame of the cable management system 10, e.g., along the top of the ladder tray type frame. The electrical wiring may be hard wired to the LED strip wiring 230, or the electrical wiring may include a connector (not shown) that can be removably connected to a connector on the LED strip wiring 230. In another embodiment, power for the low voltage lighting assembly can be provided by electrical wiring that extends through side member 240A of the frame, and includes a connector (not shown) that can be removably connected to a corresponding connector provided on LED strip wiring 230.

Figure 7:
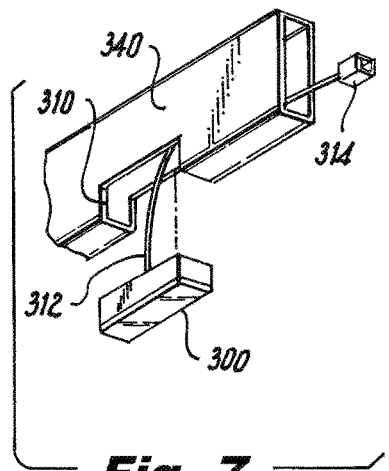
FIG. 7 is an exploded view of a low voltage lighting assembly according to another illustrative embodiment of the present disclosure.

Referring to FIG. 7, another illustrative embodiment of a low voltage lighting system according to the present disclosure is shown. In this embodiment, the low voltage lighting assembly includes an LED module that may include one or more LEDs. The low voltage lighting system in this configuration would include one or more LED modules. The LED module may be integrated into the side members forming the ladder type tray frame. For example, as shown in FIG. 7, LED module 300 may be snap fit and integrated into slots 310 provided in side members 340. The LED module 300 may be provided as an alternative to or in addition to the above described cross member LEDs. Low voltage wiring 312 extends from LED module 300 and into the channel of side members 340 and includes a connector 314. According to an illustrative embodiment of the present disclosure, sensors may be integrated with the LED module 300. For example, according to an illustrative embodiment of the present enclosure, motion sensors, temperature sensors, air flow sensors, etc. may be integrated into the LED module 300. The LED module and sensors can be powered utilizing Power over Ethernet (PoE) and information from the sensors can be returned to a control unit and used for security purposes and/or climate control purposes.

Figure 8:
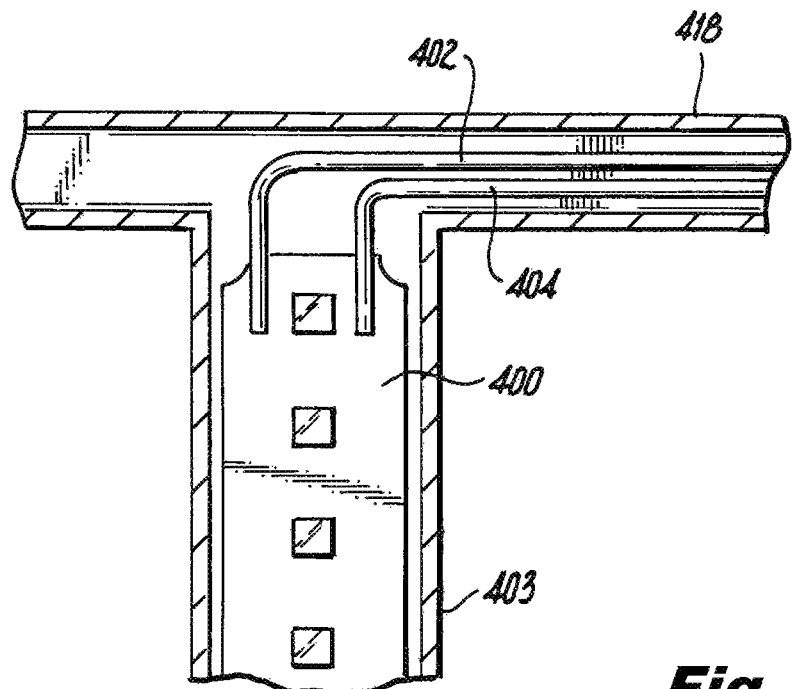
FIGS. 8 and 9 are plan views of portions of low voltage lighting assemblies for describing various wiring arrangements according to illustrative embodiments of the present disclosure.
Figure 9:
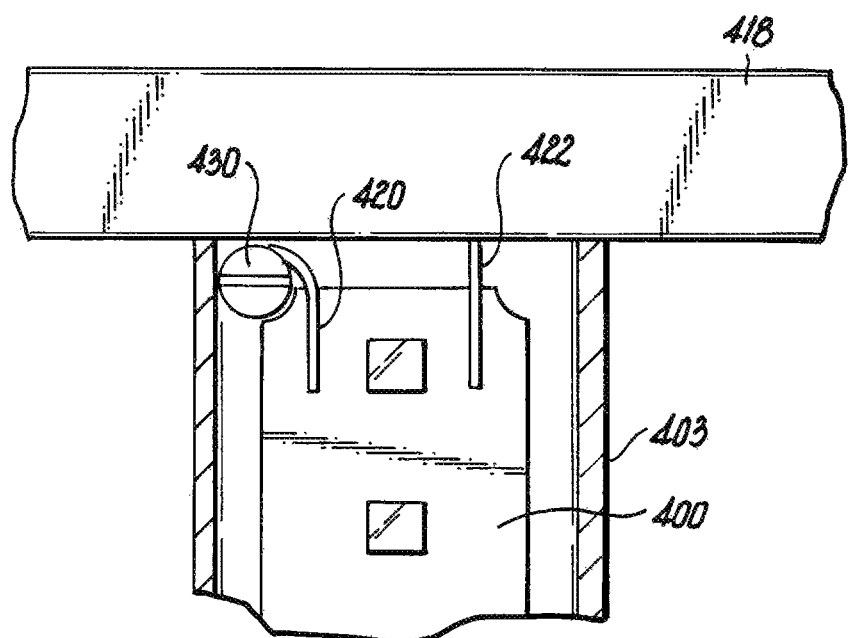
Figure 10:
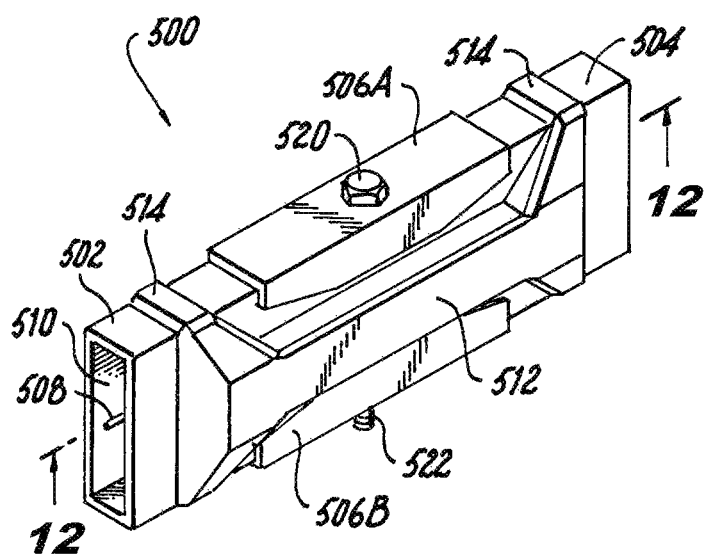
FIGS. 10 and 11 are front and rear perspective views, respectively, of a butt splice used for connecting modules of a ladder tray type cable management system frame according to an illustrative embodiment of the present disclosure.

As described above, power may be provided to the low voltage lighting assemblies in the above-described embodiments in several different ways. For example, according to an illustrative embodiment shown in FIG. 8, a pair of wires 402, 404 can be hard wired, e.g., soldered or otherwise connected, to an LED array 400 which is provided in cross member 403. The pair of wires 402, 404 may then be channeled through a side member 418 in the frame and may include a connector (not shown) that can be removably connected to a connector on a low voltage power cable running through the side member 418. As noted above, power may be supplied to the lighting and/or sensors using, for example, Power over Ethernet (PoE). Connectors may be, for example, RJ45 connectors or similar connectors. According to another illustrative embodiment shown in FIG. 9, if an electrically conductive material (e.g., aluminum, steel, etc.) is used to form the frame of the cable management system, e.g., a ladder tray type frame, one of the circuit electrical paths (e.g., ground wire 420) from LED array 400 may be pigtailed or otherwise attached (e.g., by screw 430) to the ladder tray cross-member 403 so as to utilize the bonded grounding conductor system of the cable management system as the ground return path for the low voltage lighting. The other circuit electrical path 422 (e.g., the low voltage power wire) may then be channeled through side member 418 and may include a connector that can be removably connected to a connector on a low voltage power cable running through side member 418.

Figure 11:
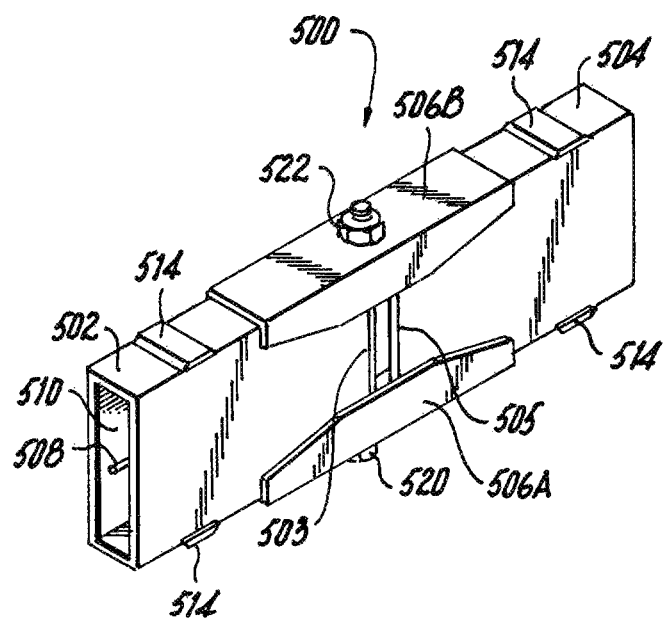

Generally, as noted above, cable management system frames are formed from a plurality of modular units. For example, a cable management system frame may be formed from multiple modular "ladder tray sections" attached together to form a continuous ladder tray. In an exemplary embodiment, the ladder tray modules are joined together utilizing a butt splice 500 such as that shown in FIGS. 10-14. Butt splice 500 includes a pair of brackets 506A, 506B that slip over end portions 503, 505 of side members 502, 504, respectively of the frame, as shown most clearly in FIG. 11. A bolt 520 extends through brackets 506A and 506B and a nut 522 is used to secure the brackets 506A and 506B and the two side members 502, 504 together by tightening the bolt 520 and nut 522. Low voltage wiring 508 extends through each side member 502, 504 and is terminated with a connector 540 as shown in cross-section in FIG. 12. According to this embodiment, the connectors 540 extend through and are seated in orifices 503 provided in side members 502, 504. A jumper cable 542 is provided for electrically connecting the low voltage wiring 508 extending through each side member 502, 504. Each end of jumper cable 542 includes a connector 541 that mates with connectors 540. A cover 512 includes arms 514 dimensioned to snap fit onto side members 502, 504. Cover 512 forms a chamber 550 for covering jumper cable 542.

Figure 12:
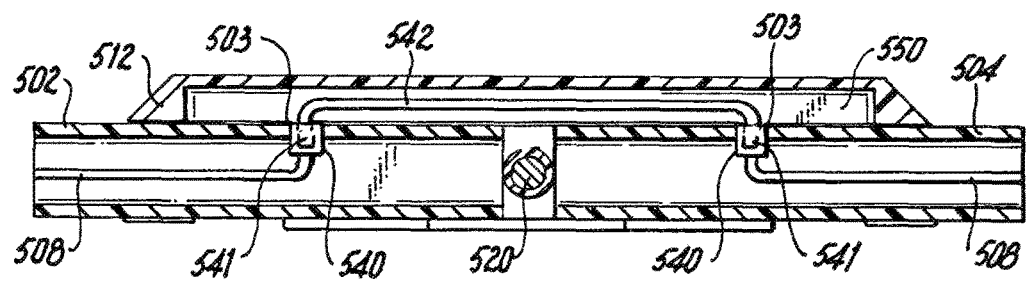
FIG. 12 a cross-sectional view taken along lines 12-12 of FIG. 10 for describing an illustrative embodiment of the interconnection between modules.
Figure 13:
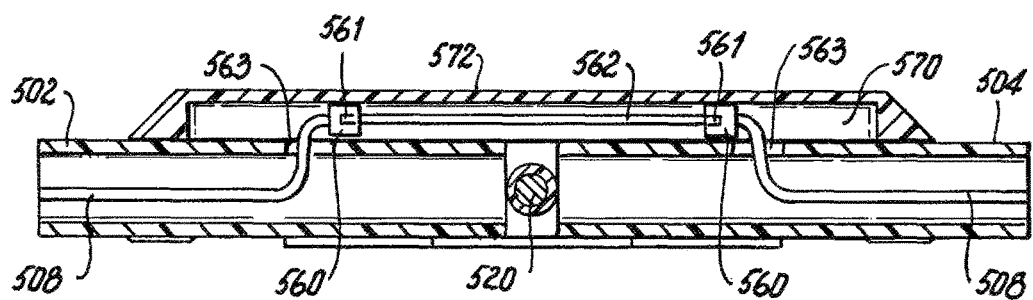
FIG. 13 is a cross-sectional view taken along lines 12-12 of FIG. 10 for describing another illustrative embodiment of the interconnection between modules.

Another embodiment of the joint between the ladder tray modules is shown in FIG. 13 and is similar to the embodiment shown in FIG. 12. According to this embodiment, cables 508 extend through orifices 563 provided in side members 502, 504 and into chamber 570 formed by cover 572. Jumper cable 562 is provided for electrically connecting the low voltage wiring 508 extending through each side member 502, 504. Each end of jumper cable 562 includes a connector 561 that mates with connectors 560.

Figure 14:
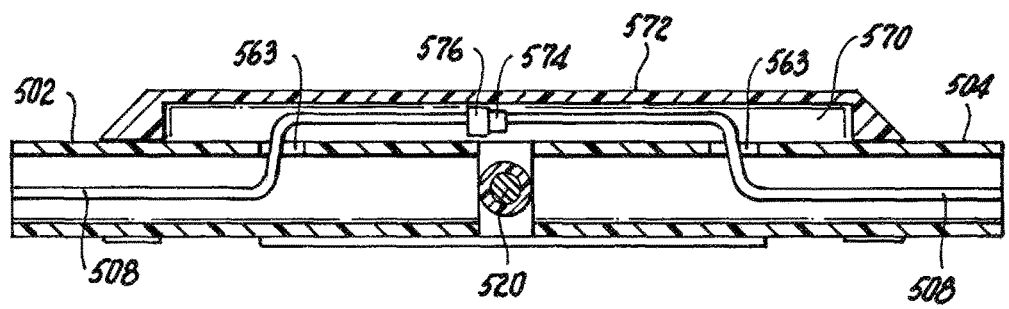
FIG. 14 is a cross-sectional view taken along lines 12-12 of FIG. 10 for describing another illustrative embodiment of the interconnection between modules.

Another embodiment of the joint between the ladder tray modules is shown in FIG. 14 and is similar to the embodiment shown in FIG. 13. According to this embodiment, cables 508 extend through orifices 563 provided in side members 502, 504 and into chamber 570 formed by cover 572. One cable 508 is terminated with a connector 574 and the other cable 508 is terminated with a connector 576 which mates with connector 574. In this configuration, a single electrical connection is used to continue the electrical path within the cable management system.

Figure 15:
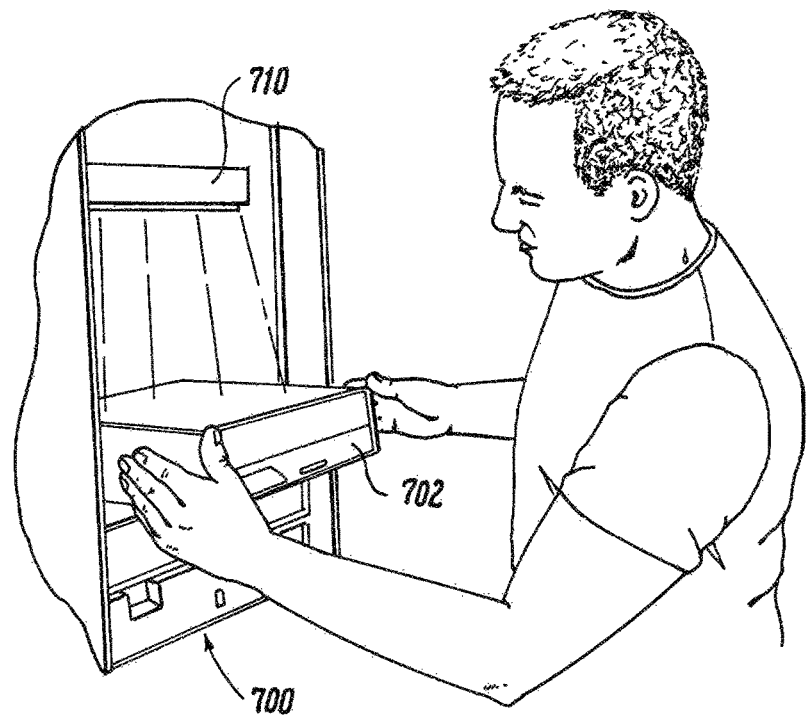
FIG. 15 is a front perspective view of a rack having a low voltage lighting assembly incorporated into a cross member of the rack.
Figure 16:
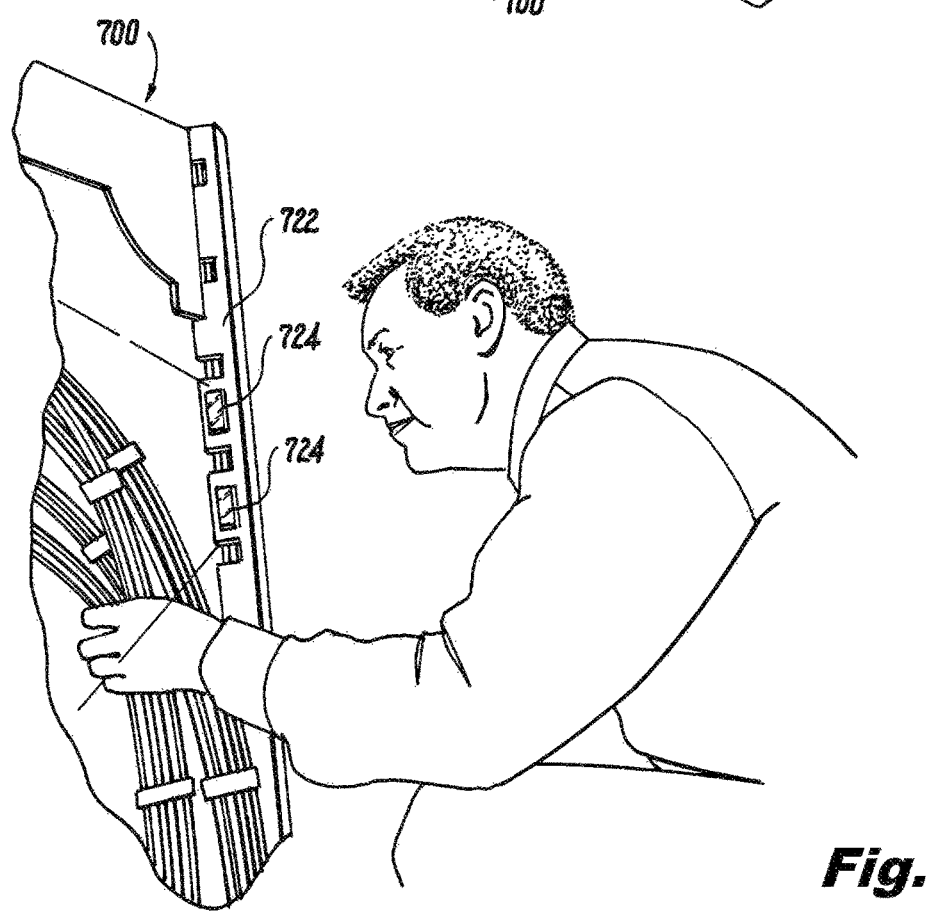
FIG. 16 is a front perspective view of a rack having multiple low voltage lighting assemblies incorporated into a vertical member of the rack.

Referring to FIGS. 15 and 16, illustrative embodiments of incorporating low voltage lighting assemblies into rack or cabinets will be described. In one illustrative embodiment, the low voltage lighting assembly 710, e.g., an LED array, may be provided in shelving or cross members 710 of an equipment rack 700 holding electrical equipment 702, as depicted in FIG. 14. In addition, or alternatively, one or more low voltage lighting assemblies 724, (e.g., one or more LED modules, may be provided in vertical members 722 of the equipment rack 700, as depicted in FIG. 15.

As described above with regard to FIG. 7, sensors may be integrated with the low voltage lighting assemblies. According to other illustrative embodiments of the present enclosure, motion sensors, temperature sensors, air flow sensors, etc. may be separately integrated into the cable management system, equipment rack, cabinet and/or raceway, etc. The sensors can be powered utilizing PoE and information from the sensors can be returned to a control unit and used for security purposes and/or climate control purposes.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A cable management system comprising:
    a cable management frame including a first hollow elongated side member, a second hollow elongated side member spaced from the first side member and substantially parallel to the first side member, and at least one cross member having a first end secured to the first side wall and a second end secured to the second side wall, wherein the hollow portion of the first and second side walls are configured to receive one or more electrical conductors; and
    at least one low voltage lighting assembly incorporated into the at least cross member.

2. The cable management system as recited in claim 1, wherein the low voltage lighting assembly comprises at least one LED strip.

3. The cable management system as recited in claim 2, wherein the at least one LED strip comprises a single LED.

4. The cable management system as recited in claim 2, wherein the at least one LED strip comprises an LED array.

5. The cable management system as recited in claim 1, wherein the at least one low voltage lighting assembly is incorporated into the at least one cross member by integrally forming the at least one low voltage lighting assembly into the at least one cross member.

6. The cable management system as recited in claim 5, wherein electrical wiring for the at least one low voltage lighting assembly runs at least partially within the cable management frame.

7. The cable management system as recited in claim 1, wherein the at least one low voltage lighting assembly is incorporated into the at least one cross member by mounting the at least one low voltage lighting assembly to the at least one cross member.

8. The cable management system as recited in claim 7, wherein electrical wiring for the at least one low voltage lighting assembly runs at least partially along the cable management frame.

9. The cable management system as recited in claim 1, wherein the cable management frame comprises an overhead cable management frame.

10. The cable management system as recited in claim 9, wherein the overhead cable management frame comprises a ladder tray type frame.

11. The cable management system as recited in claim 1, wherein the cable management frame comprises a plurality of interconnected modules.

12. The cable management system as recited in claim 11, wherein the plurality of interconnected modules have at least one power source wire running through the modules, and wherein the plurality of interconnected modules are interconnected using butt splices and the at least one power source wire running through the modules are connected using a connector.

13. A lighting kit for a cable management system, the lighting kit comprising:
    a structural member; and
    at least one low voltage lighting assembly mounted to an exterior surface of the structural member or integrally formed into the structural member, the at least one low voltage lighting assembly being electrically connected to an electrical connector.

14. The lighting kit as recited in claim 13, wherein the at least one low voltage lighting assembly comprises an LED.

15. The lighting kit as recited in claim 13, wherein the at least one low voltage lighting assembly comprises an LED array.

16. A cable management system comprising:
    a cable management frame comprising first and second elongated hollow side members and a plurality of cross members, wherein each of the plurality of cross members has a first end secured to the first side member and a second end secured to the second side member such that the first and second side members are spaced apart and substantially parallel; and
    a plurality of low voltage lighting assemblies, wherein each of the plurality of low voltage lighting assemblies is secured to or integrally formed into a respective cross member.

17. The cable management system as recited in claim 16, wherein each of the plurality of low voltage lighting assemblies comprise at least one LED.

18. The cable management system as recited in claim 16, wherein each of the plurality of low voltage lighting assemblies comprise an LED array.

19. A modular unit for a cable management system, the modular unit comprising:
    a frame including a first hollow elongated side member having a predefined length and terminating in first and second ends, a second elongated side member having the predefined length and terminating in first and second ends and a plurality of cross members, wherein each of the plurality of cross members has a first end secured to the first side member and a second end secured to the second side member such that the first and second side members are spaced apart and substantially parallel and such that the plurality of cross members are spaced apart and substantially perpendicular to the first and second side members;
    at least one low voltage lighting assembly incorporated into at least one of the plurality of cross members; and at least one electrical wire incorporated into the hollow portion of the first or second side member, wherein the at least one electrical wire terminates at the first end of the first or second side member with a connector and at the second end of the first or second side member with a connector.

20. The modular unit as recited in claim 19, wherein the at least one electrical wire comprises a power wire for distributing power to the at least one low voltage lighting assembly.

21. The modular unit as recited in claim 19, wherein the at least one electrical wire comprises two electrical wires, wherein one electrical wire is a power wire for distributing power to the at least one low voltage lighting assembly, and the other electrical wire is a ground wire.

22. The modular unit as recited in claim 19, wherein the frame comprises a ladder tray type frame.

23. The modular unit as recited in claim 19, wherein the at least one low voltage lighting assembly is incorporated into the at least one of the plurality of cross members by integrally forming the at least one low voltage lighting assembly into the at least one cross member.

24. The modular unit as recited in claim 19, wherein the at least one low voltage lighting assembly is incorporated into the at least one of the plurality of cross members by integrally forming the at least one low voltage lighting assembly into at least one of the pair of side members.

25. The modular unit as recited in claim 19, wherein the at least one low voltage lighting assembly comprises an LED.

26. The modular unit as recited in claim 19, wherein the at least one low voltage lighting assembly comprises an LED array.

* * * * *